Patented June 20, 1950

2,512,053

UNITED STATES PATENT OFFICE 2,512,053

ALUMINO SILICATE CATION EXCHANGERS

Calvin Calmon, United States Army, assignor to The Permutit Company, New York, N. Y., a corporation of Delaware No Drawing. Application December 18, 1944, Serial No. 568,796

6 Claims. (Cl. 23—113)

This invention relates to alumino silicate cation exchangers and the method of preparing them.

One of the problems that has been accentuated as a result of the war is the provision of water for those stranded at sea in life rafts. For this purpose various devices have been proposed for the desalting of seawater. Perhaps of all the devices proposed, the most satisfactory is the use of a silver cation exchanger which, together with other ingredients, is capable of desalting seawater to a degree sufficient to make it potable. Silver cation exchangers for this purpose should have a maximum capacity per unit of volume and weight, particularly those designed for use by aviators who carry the cation exchanger in the form of briquettes in their emergency equipment.

An object of this invention is to provide a cation exchanger having an extremely high capacity per unit of weight.

Another object of this invention is to desalt seawater by means of a compact silver alumino silicate cation exchanger.

The preparation of precipitated sodium alumino silicates is well known in the art. They are ordinarily prepared for the softening of water. For this reason, particular emphasis has been heretofore made to their resistance to attack by aggressive waters and to their ability to withstand repeated regenerations. These sodium alumino silicates are usually prepared by the reaction of sodium silicate with sodium aluminate, alum or a mixture of these materials. For example, the Bruce patent, U. S. 1,906,202, granted on April 25, 1933, describes an alkali metal alumino silicate which is adapted for the softening of water and is prepared by the reaction of sodium silicate with a mixture of sodium aluminate and alum. These cation exchangers are relatively hard and possess good capacity for the purpose for which they were proposed.

Silver cation exchangers are also known in the art and many of these silver cation exchangers could undoubtedly be used for desalting seawater. However, space and weight requirements in emergency equipment are so stringent that materials prepared according to the prior art are virtually useless from a practical point of view.

In accordance with this invention, a sodium alumino silicate is prepared which, when converted to the corresponding silver alumino silicate, has a greatly improved capacity for the removal of chlorides from seawater. The use of the silver alumino silicate of this invention results in chemical desalination on a practical basis by keeping well within the stringent space and weight requirements for emergency equipment. The silver alumino silicates of this invention have capacities as high as 3.9 m. eq./g. when employed to desalt seawater to a final chloride ion concentration of 2000 p. p. m. as $CaCO_3$ (40 m. eq./l.). Earlier attempts to prepare a silver alumino silicate for this purpose from a commercial sodium alumino silicate used for water treatment gave a product which had a capacity of only 1.65 m. eq./g. under the same conditions. Thus, this commercial material is capable of treating only 362 ml. of seawater per 100 grams of silver alumino silicate, while the composition prepared according to this invention produces 856 ml. of potable water per 100 grams of silver alumino silicate used. Considered from another basis it requires 276 g. of commercial product to prepare a liter of drinking water and only 117 g. of one of the products prepared according to this invention.

The alkali metal alumino silicate cation exchange materials prepared in accordance with this invention, when converted to the corresponding silver alumino silicate, are capable of reacting with chlorine ions to the extent of at least 75% of their theoretical capacity corresponding to an actual capacity of not less than 3.4 m. eq./g. These alumino silicate cation exchange materials are prepared by initially forming a gel by mixing solutions of an alkali metal silicate, an alkali metal aluminate and a soluble aluminum salt which yields aluminum ions when dissolved in water. The solutions are mixed in the proportions such that the final gel has an $Al_2O_3:SiO_2$ molar ratio between 1:1.5 and 1:4 and in which the soluble aluminum salt supplies from 5 to 20 mol percent of the $Al_2O_3$ added in the preparation. A product having especially desirable properties is prepared by employing proportions of reactants such that the final gel has an $Al_2O_3:SiO_2$ molar ratio of 1:2.2 and in which the soluble aluminum salt, such as aluminum sulfate, supplies about 15 mol percent of the $Al_2O_3$ in the preparation. The resulting sodium alumino silicates having these latter ratios may be converted into the corresponding silver alumino silicate by the methods herein described.

The product is particularly sensitive to the conditions employed in the drying of the gel and special precautions must be observed from this point on. One method of avoiding a product undesirable for the purpose intended is to heat the gel before separating it from the mother liquor. Such heat treatment makes it relatively insensitive to subsequent drying conditions. In general, the gel may be heated to a temperature between 50° and 95° C. The exact conditions of the heat treatment may vary widely. For example, maintaining the temperature of this gel at 50° C. for more than 6 hours satisfactorily reduces its sensitivity toward rapid drying. On the other hand, a treatment for only 1 hour at 85° C. is equally satisfactory from this standpoint. There are, however, other considerations which govern the exact choice of experimental conditions. The use of higher temperatures results in the formation of final products having lower densities than those produced by the use of lower temperatures. Thus, for example, starting with the same raw gel, heat treatment at 85° C. for 1 hour produced a final silver alumino silicate with a density of 0.65 g./ml.; treatment at 50° C. for 1 hour produced a composition having a density of 0.93 g./ml.; while treatment at this latter temperature for 6 hours yielded a product having a density of 0.85 g./ml. While the product prepared by the 1 hour treatment at 85° C. and that prepared by the 6 hour treatment at 60° C. had substantially the same capacities on a weight basis, severe volume restrictions in the emergency equipment forces the choice of the low temperature treatment in order to obtain a product of maximum density.

The heated gel is then separated from the mother liquor and dried. This drying operation may be conducted at low humidities with resultant rapid drying without appreciable effect upon the capacity of the ultimate product.

Alternately, instead of heating the mixture, the freshly formed gel may be filtered directly by any convenient device such as a filter press. The press cake is placed in a dryer and, during the early stages of the drying, a high humidity atmosphere is maintained. This object may be achieved by any suitable technique such as closing the dampers on the dryer, recirculating the air in the dryer, introducing steam with the influent air or other equivalent methods. Following this initial high humidity period the drying may be completed at lower humidities and at a relatively fast rate. Desirably the initial drying under this alternate procedure is conducted under a relative humidity of not less than 75%. This alternate drying procedure may, if desired, be combined with the gel heating procedure heretofore desribed.

The alkali metal alumino silicates prepared by either of the above techniques may be crushed to a suitable size, washed free of soluble salts, if desired, and converted to the corresponding silver alumino silicates by contacting with a stoichiometrical excess of a solution of a soluble silver salt. Following this treatment, the product may be rinsed substantially free of excess salts and dried.

A more comprehensive understanding of this invention is obtained by reference to the following example:

Commercial sodium silicate containing 29% silica was diluted with an equal volume of water. 278 gallons of this diluted sodium silicate were dissolved in 515 gallons of water. 369 lbs. of commercial sodium aluminate containing 45.1% $Al_2O_3$ and 319 lbs. of another brand of commercial sodium aluminate containing 54.6% $Al_2O_3$ were dissolved in 1078 gallons of water. 354 lbs. of commercial aluminum sulfate were dissolved in 683 gallons of water. The sodium aluminate and aluminum sulfate solutions were then added simultaneously to the sodium silicate while agitating. The agitation was continued for 10 minutes after gelation had occurred. The gel was heated to 60–65° C. by introduction of steam and was held at this temperature for about six hours, after which it was pumped to a filter press. When the press was full, it was opened and the press cake broken up and distributed on dryer trays. The trays were then placed in a dryer operated at 70 to 95° C. for 24 to 48 hours. During the drying, the dampers on the dryer were closed in order to recirculate the maximum amount of air and to maintain a high humidity.

On removal from the dryer the dried sodium alumino silicate was crushed to pass through a 30 mesh screen. 2000 lbs. of this material containing 8–10% free moisture were placed in a large tank and backwashed for 15 minutes to remove fines, introducing the water at a rate of about 2 gal./min./sq. ft. of surface area and then at about 1 gal./min./sq. ft of surface area for 45 minutes to remove further soluble salts. At the conclusion of this washing, a partially exhausted silver nitrate solution from a previous preparation was added to the tank. This solution contained about 400 lbs. of silver nitrate and 200 lbs. of sodium nitrate in 700 gallons of solution and was recirculated downflow through the tank of alumino silicate granules until no further silver ion was detectable in the circulating liquid. This liquid was then run to waste and a fresh solution containing 1600 lbs. of silver nitrate in 700 gallons of solution was introduced and circulated downflow until no further change in the silver ion concentration of the solution took place. This solution was then pumped off to a storage tank for use in the next batch. The granular silver alumino silicate was washed upflow with 6000 gallons of demineralized water in order to remove excess salts. After draining off the liquid the granules were dried at 135° C. for about 18 hours.

By following the procedure of this invention any alkali metal alumino silicate may be prepared, such as sodium alumino silicate, potassium alumino silicate or lithium alumino silicate by employing the appropriate alkali metal silicate and alkali metal aluminate. For exmple, the sodium alumino silicate is prepared by initially forming a gel by mixing solutions of sodium silicate, sodium aluminate and a soluble aluminum salt yielding aluminum ions, such as aluminum sulfate or aluminum chloride. The proportions of the ingredients are such that the $Al_2O_3:SiO_2$ molar ratio is between 1:1.5 and 1:4 and the soluble aluminum salt supplies from 5 to 20 mol percent of the $Al_2O_3$ added in the preparation. The gel is then treated by either of the methods heretofore described and subsequently completely dried. The resulting sodium alumino silicate, when converted to the corresponding silver alumino silicate, is capable of reacting with chloride ions to the extent of at least 75% of its theoretical capacity, corresponding to an actual capacity of not less than 3.4 m. eq./g.

In determining the capacity of silver alumino silicates such as those herein described, a given weight of the silver cation exchange material is used to treat a given volume of a standard seawater for a period of ½ to 1 hour. During this period the mixture is well agitated. The test is preferably carried out with silver alumino silicate finer than 30 mesh. As pointed out by various authorities on oceanography, the composition of seawater varies widely throughout the world (see "The Oceans" by Sverdrup, et al., published by Prentice Hall, New York, 1942). An accepted composition for a "standard" seawater is the following:

| Anions | M. eq./l. | Cations | M. eq./l. |
|---|---|---|---|
| $HCO_3^-$ | 2 | $Ca^{++}$ | 17 |
| $Cl^-$ | 495 | $Mg^{++}$ | 96 |
| $SO_4^=$ | 47 | $Na^+$ | 431 |
| Total anions | 544 | Total cations | 544 |

In order to make such a seawater potable, the chloride concentration must be reduced by about 90%. For the purposes of this test, a final chloride ion concentration of 40 m. eq./l. (2000 p. p. m. as $CaCO_3$) has been chosen as the standard end point. In accordance with the laws of adsorption, such as the Freundlich Adsorption Isotherm, deviations of the final chloride concentration from this value will result in deviations of the capacity. Therefore, all capacities must be based upon experiments resulting in a final chloride ion concentration of 40 m. eq./l. or upon two or more experiments resulting in different chloride ion concentrations from which the capacity at 40 m. eq./l. final chloride ion concentration may be calculated by means of the Freundlich adsorption isotherm. Throughout the description and claims capacities of silver alumino silicate materials refer to those determined by this method and calculated for a final chloride ion concentration of 40 m. eq./l.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What is claimed is:

1. The method of preparing a silver alumino silicate cation exchange material of not less than 3.4 m. eq. per gram capacity for the removal of chloride ions, said method comprising forming a gel by mixing solutions of an alkali metal silicate, an alkali metal aluminate and a soluble aluminum salt yielding aluminum ions, in such proportions that the final gel has an $Al_2O_3:SiO_2$ molar ratio between 1:1.5 and 1:4 and that the said soluble aluminum salt supplies from 5 to 20 mol percent of the $Al_2O_3$ added in the preparation, initially drying said gel under at least 75% relative humidity, completing the drying, contacting the resulting product with a stoichiometrical excess of a solution of a soluble silver salt, substantially freeing the product from excess salts and drying the resulting product.

2. The method of preparing a silver alumino silicate cation exchange material having a capacity of not less than 3.4 m. eq. per gram for the removal of chloride ions, said method comprising forming a gel by mixing solutions of an alkali metal silicate, an alkali metal aluminate and a soluble aluminum salt yielding aluminum ions in such proportions that the final gel has an $Al_2O_3:SiO_2$ molar ratio between 1:1.5 and 1:4 and that the said soluble aluminum salt supplies from 5 to 20 mol percent of the $Al_2O_3$ added in the preparation, heating the resulting mixture between 50° and 95° C., separating the gel from the mother liquor, drying said gel to remove substantially all of the free water therefrom, contacting the resulting product with a solution of a soluble silver salt in excess of that theoretically required, removing the excess of salts from the resulting silver alumino silicate and drying the silver alumino silicate.

3. The method of preparing a silver alumino silicate cation exchange material having a capacity of not less than 3.4 m. eq. per gram for the removal of chloride ions, said method comprising forming a gel by mixing solutions of an alkali metal silicate, an alkali metal aluminate and a soluble aluminum salt yielding aluminum ions in such proportions that the final gel has an $Al_2O_3:SiO_2$ molar ratio between 1:1.5 and 1:4 and that the said soluble aluminum salt supplies from 5 to 20 mol percent of the $Al_2O_3$ added in the preparation, separating the gel from the mother liquor, initially drying said gel under at least 75% relative humidity, completing the drying, contacting the resulting product with a solution of a soluble silver salt in excess of that theoretically required, removing the excess of salts from the resulting silver alumino silicate and drying the silver alumino silicate.

4. The method of preparing a silver alumino silicate cation exchange material having a capacity of not less than 3.4 m. eq. per gram for removal of chloride ions, said method comprising forming a gel by mixing solutions of sodium silicate, sodium aluminate and aluminum sulfate in such proportions that the final gel has an $Al_2O_3:SiO_2$ molar ratio between 1:1.5 and 1:4 and in which solutions the aluminum sulfate supplies from 5 to 20 mol percent of the $Al_2O_3$ added in the preparation, separating the gel from the mother liquor, initially drying said gel under at least 75% relative humidity, completing the drying of said composition, contacting the resulting product with a stoichiometrical excess of a solution of a soluble silver salt, rinsing substantially free of excess salts and drying the resulting product.

5. The method of preparing a silver alumino silicate cation exchange material having a capacity of not less than 3.4 m. eq. per gram for the removal of chloride ions, said method comprising forming a gel by mixing solutions of sodium silicate, sodium aluminate and aluminum sulfate in such proportions that the final gel has an $Al_2O_3:SiO_2$ molar ratio of approximately 1:2.2 and in such proportions that the aluminum sulfate supplies about 15 mol percent of the $Al_2O_3$ added in the preparation, heating the resulting mixture between about 55° and 65° C., separating the gel from the mother liquor, drying said gel under at least 75% relative humidity, rinsing the dried gel, impregnating with a solution of silver nitrate in an amount in excess of that theoretically required, removing the excess of salts from the resulting silver alumino silicate and drying the silver alumino silicate.

6. The method of preparing a sodium alumino silicate cation exchange material which, when converted to the corresponding silver alumino silicate, has a capacity of not less than 3.4 m. eq. per gram for the removal of chloride ions, said method comprising forming a gel by mixing solutions of sodium silicate, sodium aluminate and a soluble aluminum salt yielding aluminum ions in such proportions that the final gel has an $Al_2O_3:SiO_2$ molar ratio of 1:1.5 and 1:4 and that the said soluble aluminum salt supplies from 5 to 20 mol percent of the $Al_2O_3$ added in the preparation, initially drying said gel under at least 75% relative humidity and completing the drying.

CALVIN CALMON.

(References on following page)

REFERENCES CITED

The following references are of record in the file of this patent:

UNITED STATES PATENTS

| Number | Name | Date |
|---|---|---|
| 1,906,163 | Lasselle | Apr. 25, 1933 |
| 1,906,181 | Riley | Apr. 25, 1933 |
| 1,906,202 | Bruce | Apr. 25, 1933 |
| 1,906,203 | Bruce | Apr. 25, 1933 |
| 1,978,447 | Austerweil | Oct. 30, 1934 |
| 2,210,650 | Behrman | Aug. 6, 1940 |

FOREIGN PATENTS

| Number | Country | Date |
|---|---|---|
| 805,092 | France | Aug. 17, 1936 |